3,299,651
SYSTEM FOR PROVIDING AIR CONDITIONING
AND PRODUCING FRESH WATER
William L. McGrath, Syracuse, N.Y., assignor to Carrier Corporation, Syracuse, N.Y., a corporation of Delaware
Filed Oct. 24, 1965, Ser. No. 504,505
18 Claims. (Cl. 62—93)

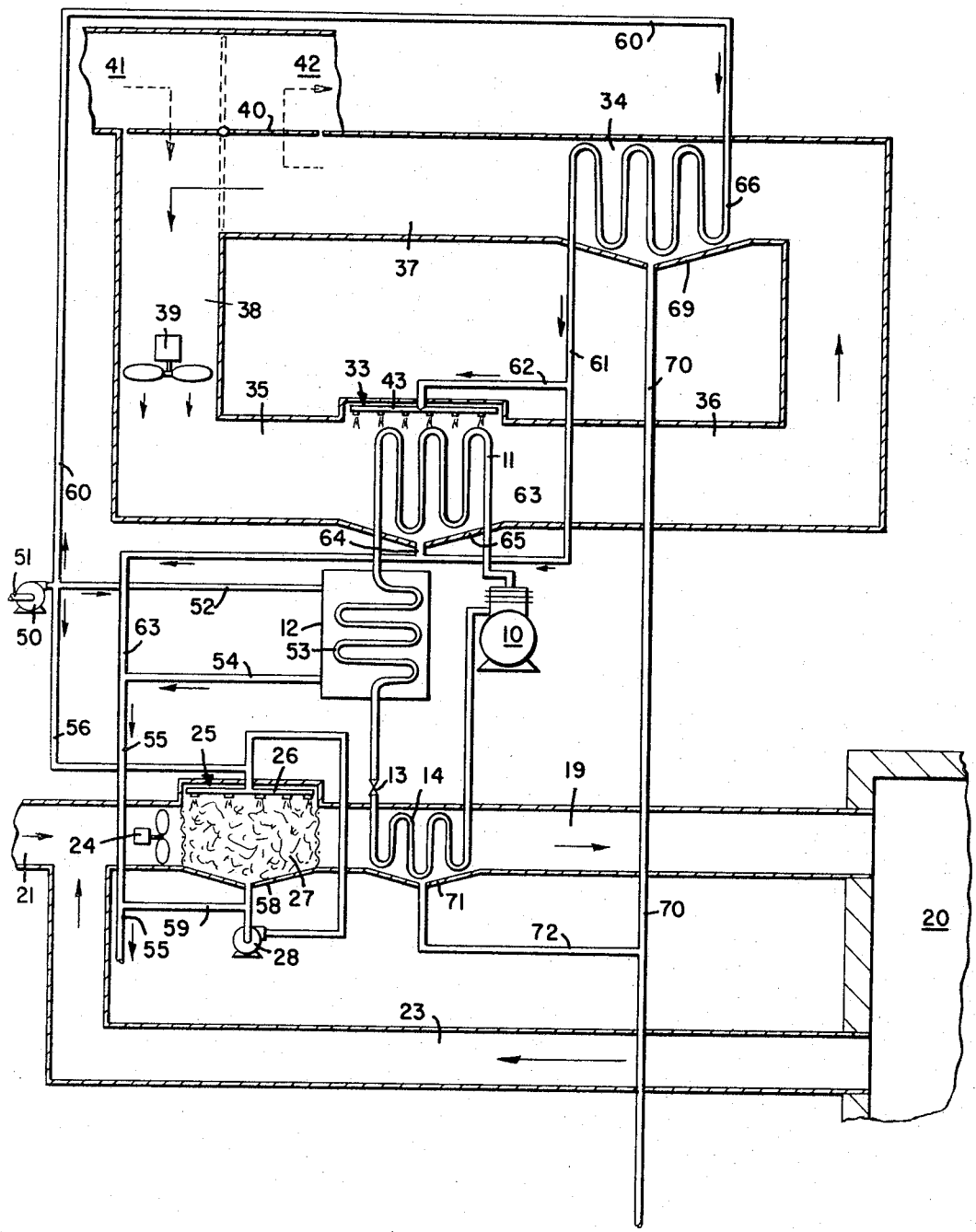

This application relates to a system for providing air conditioning and for simultaneously producing fresh water from an aqueous solution such as sea water.

In many sections of the world there exists an acute need for drinkable water. There have been suggested previously many systems for converting salt laden or contaminated water to potable water. Most of these proposals, however, have necessarily involved complex, specialized equipment which was neither readily available, nor capable of economically producing fresh water, and consequently, few systems have been found to be commercially feasible. In many of the locations where the need for potable water is great, the climate is warm and arid and extensive use is made of air conditioning in hotels, offices and residential buildings.

It is an object of this invention to provide a combined system which is capable of providing both air conditioning or refrigeration and at the same time of providing substantial quantities of fresh water.

It is a further object of this invention to provide a method of operating an air conditioning or refrigeration system so as to provide fresh water.

It is a still further object of this invention to provide a system for providing both fresh water and air conditioning which employs relatively standard components and involves little additional capital cost or operating cost over that required for the air conditioning system alone.

In accordance with a preferred embodiment of this invention, there is provided a system including a refrigeration circuit having a refrigerant compressor, a refrigerant condenser and a refrigerant evaporator arranged to provide refrigeration. The refrigerant condenser may be of the evaporative type and is arranged in heat exchange relation with sea water to reject heat by evaporating a portion thereof. The water vapor produced by the heat rejected from the refrigerant condenser is then condensed to provide fresh product water. In addition, the air being conditioned is saturated with water vapor evaporated by contacting the air with sea water, after which the moisture laden air is passed to a refrigerant evaporator where the moisture is condensed from the air to form additional product water. Thereafter the air is passed to the room or other location being conditioned.

One of the significant features of this invention is that fresh water is produced by the system without any significant expenditure of energy since the cooling and dehumidifying function is required in any event. The saturating of the conditioned air with water vapor is adiabatic and thus does not impose any additional heat removal requirement in order to produce product water. Thus, fresh water produced by the refrigerant evaporator is largely "free." Also, the conditioned air saturator serves the additional functions of odor removal and cleansing of the air of dust, pollen and other contaminants.

In addition, the heat which is normally rejected from the refrigerant condenser to the atmosphere is employed to do useful work by producing additional pure water vapor. Since the temperature at which this water vapor is condensed is relatively high, it is only necessary to pass some sea water or other water to be purified in heat exchange relation with it to provide additional fresh product water. Consequently, for a relatively insignificant operating cost, a substantial amount of fresh water can be produced by employing the invention described herein.

Furthermore, the additional components necessary to produce fresh water in accordance with this invention are relatively standard and readily available items which are normally constituent parts of air conditioning systems and their addition involves a relatively small additional capital cost to the cost of a refrigeration system alone.

It is estimated, for example, that the operating cost of an electrically operated, 40 ton air conditioning system is only negligibly increased to produce approximately two thousand gallons a day of fresh water.

The above features and objects of this invention will become apparent from the following detailed description and with reference to the attached drawing which shows a schematic diagram, partly in cross section, of a combination air conditioning and saline water conversion system.

Referring to the drawing, there is shown a system for providing both conditioned air and fresh water. The system to be described is capable of separating fresh water from either sea water, brackish water, or other salt laden or contaminated aqueous solutions, such as well water having a high dissolved salts content. For purposes of description, however, it will be assumed that it is desired to separate fresh water from sea water.

The system incudes a refrigeration circuit having a refrigerant compressor 10, a refrigerant condenser 11 which is preferably of the evaporative condenser type, a refrigerant subcooler 12, an expansion valve 13, and a refrigerant evaporator 14 connected by suitable piping to provide refrigeration. While the system illustrated in the drawing is shown to employ a reciprocating compressor, other types of refrigeration circuits, such as centrifugal or absorption refrigeration circuits, can be employed instead. Also, it will be understood that a saturating spray chamber similar to a cooling tower may be employed with circulation of the cooled water through a closed water cooled condenser as an equivalent to the evaporative condenser.

There is also provided an air handling system 19 for conveying air being conditioned to and from conditioned space 20. Air handling system 19 comprises outside air duct 21 for admitting outside air into the air handling system where it is mixed with returning room air passing through duct 23 from conditioned space 20. Fan 24 passes the mixed air through an air saturating means 25, then into heat exchange relation with refrigerant evaporator 14, and through duct 22 into space 20.

Air saturating means 25 comprises a spray header or other saturating means 26 for increasing the water vapor content of the air passing therethrough by adiabatically contacting it with sea water. Preferably, wood or plastic packing 27 is disposed in air saturating means 25 to increase the surface of sea water in contact with air.

The heat rejection side of the system includes a solution evaporating means designated generally 33, product water condensing means 34, and a water vapor handling system designated generally 35. Water vapor handling system 35 comprises duct 36 for conveying water vapor from solution evaporating means 33 to product water condensing means 34 and ducts 37 and 38 for conveying vapor from product water condensing means 34 to solution evaporating means 33. Vapor handling system 35 also includes fan 39 for passing vapor or air through the ducts.

In addition, vapor handling system 35 includes damper 40, an outside air duct 41 and a discharge air duct 42. When damper 40 is in the position shown in full lines in the drawing, there is provided a substantially closed circuit for vapor to pass from solution evaporating means 33 to product water condenser means 34 back to the solution evaporating means. When damper 40 is in the position shown in dotted lines on the drawing, air is enabled to pass from duct 41 through solution evaporating means 33 and product water condensing means 34 from which it is discharged to a suitable location through duct 37 and discharge duct 42. The provision of damper 40 enables the vapor handling system to be operated in either mode depending on the desired ambient air conditions.

In operation, sea water or other salt laden aqueous solution enters the system through line 51 and is passed by pump 50 through line 52 in subcooler 12. The sea water is then discharged from subcooler 12 through line 54 into brine discharge line 55 where it is discharged from the system. The passage of relatively cool sea water through subcooler 12 in heat exchange relation with refrigerant in heat exchanger 53 serves to remove heat from the liquid refrigerant leaving refrigerant condenser 11 and thereby subcools the refrigerant in order to improve the thermodynamic efficiency of the refrigeration cycle.

Another portion of the sea water input to the system passes through line 56 into spray header 26 of air saturating means 25. The relatively unsaturated air being conditioned in the system is contacted by sea water in air saturating means 25 and a portion of the water in the sea water is evaporated into or absorbed by the air. The somewhat concentrated sea water is collected in brine sump 58 and is passed through line 59 into brine discharge line 55 where it is discharged from the system. A portion of the brine may be recirculated through pump 28 and line 29 if desired. Consequently, the air being conditioned is saturated to the desired degree with water vapor and adiabatically cooled in air saturating means 25. While it is desirable to do so, it will be understood that the air leaving air saturating means 25 may not be necessarily completely saturated, but it will be referred to as being saturated in the sense that the water vapor content of the air has at least been increased.

The saturated air being conditioned passes through air handling means 19 from air saturating means 25 into direct or indirect heat exchange relation with refrigerant evaporator 14. The air being conditioned is cooled well below its dew point by refrigerant evaporator 14, thereby condensing the water vapor and providing fresh water as a product. The fresh water product is collected in sump 71 and passed through line 72 to a suitable location where it is stored or consumed. The conditioned air is then passed through duct 22 into the room or other space 20 being conditioned. Return air from the room passes through return air duct 23 for resaturation in air saturating means 25. It will be appreciated that the cooled air which is available for supply to space 20 may be reheated by a suitable heating means (not shown) and recirculated through the air handling means in the event that cool air is not required such as in the winter but it is still desired to provide fresh water.

Still another fraction of the incoming sea water is passed by pump 50 through line 60 and through heat exchanger 66 in product water condensing means 34. The relatively cool sea water passes in heat exchange relation with water vapor in product water condensing means 34 causing the water vapor to condense. The condensed water vapor is collected in product water sump 69 where it is passed through line 70 into product water line 72 to a suitable location. Sea water passes from heat exchanger 66 through sea water line 61 into lines 62 and 63. The portion of the sea water passing into line 63 is passed into brine discharge line 55 or where it is otherwise discharged from the system. The portion of sea water which is passed to line 62 is forwarded to spray header 43 in solution evaporating means 33. In the preferred embodiment of this invention illustrated, spray header 43 discharges sea water over the exterior surfaces of refrigerant condenser 11 to provide evaporative condensing of refrigerant vapor in the condenser. Consequently, heat exchange takes place between the condensing refrigerant and the sea water sprayed over the condenser which causes water vapor to evaporate in the solution evaporating means 33. The resulting brine is forwarded by suitable means such as line 64 to brine discharge line 55 or other location where it is discharged from the system.

The water vapor generated in solution evaporating means 33 is conveyed by vapor handling system 35 from solution evaporating means 33 to product water condenser means 34 where it is condensed to provide fresh water, as previously described.

While solution evaporating means 33 is shown to comprise an evaporative condenser in the preferred embodiment illustrated, the solution evaporating means may comprise any suitable type of condenser and satuator.

Depending on the position of damper 40 two modes of operation of vapor handling system 35 are available. Air may be saturated in solution evaporating means 33 by circulating it in a continuous circuit in vapor handling system 35 by fan 39 as shown in the drawing. Alternatively, however, air may be introduced into the system through duct 41 saturated in solution evaporating means 33 passed through product water condensing means 34 where fresh water product is removed from the air and the warm air may be discharged to a suitable location through duct 42. When the ambient air temperatures are relatively high, it may be found desirable to operate the vapor handling system with the damper closed as shown in full lines in the drawing, whereas when the ambient temperature is low, it may be preferable to provide an open system as shown in dotted lines for the passage of air.

It will be seen that the practice of this invention provides a substantial quantity of fresh product water for drinking or other purposes without materially adding to the cost of the refrigeration system. The only components, in addition to the vapor handling means, that need be added to a standard refrigeration system are the conditioned air saturating means, the product water condensing means, and suitable pumps if an evaporative condenser is to be employed, in any event. The duct-work, pumps, saturators, condensers and evaporative condensers are all commonly available refrigeration system components which may either be added to an existing system or initially installed to provide fresh water production along with air conditioning.

The economies of operating a saline water conversion system in conjunction with building air conditioning is highly attractive because, aside for a slight increase in capital costs, the power consumption of the system is not materially increased. The principal reason for the low additional operating cost is that, first, the air being conditioned is utilized to produce fresh water without increasing the refrigeration load on the system. Secondly, the heat which is normally rejected to the atmosphere by the refrigerant condenser is utilized to do useful work in evaporating fresh water which may then be easily condensed. Consequently, buildings or residences which require air conditioning may easily supply a substantial quantity of their fresh water needs by utilizing the otherwise unused potential of the air conditioning system to great advantage. For example, if a building requires 100 tons it is estimated that greater than 200 gallons of water per hour can thus be formed. Thus if such a building housed 100 persons, for example, it would provide about 50 gallons per person per day when operating at full capacity.

It will be appreciated that a preferred embodiment of this invention will be shown for purposes of illustration thereof and that this invention may be otherwise embodied within the scope of the following claims.

I claim:
1. A system for providing air conditioning and for simultaneously producing fresh water from an aqueous solution comprising
   (a) a refrigeration circuit including a refrigerant condenser and a refrigerant evaporator;
   (b) solution evaporating means to pass refrigerant vapor in said refrigerant condenser in heat exchange relation with an aqueous solution to condense said refrigerant vapor and to evaporate water from said aqueous solution;
   (c) means in communication with said solution evaporating means to cool water vapor formed therein to condense water vapor to form product water;
   (d) air saturating means to pass an aqueous solution into contact with a quantity of air being conditioned, to evaporate water from said solution into said air; and
   (e) means to pass said air being conditioned from said air saturating means into heat exchange relation with said refrigerant evaporator to cool said air and to condense water vapor therefrom, said cooled air being available for supply to a region to be air conditioned and said condensate being collected to provide additional product water.

2. A system as defined in claim 1 including means for passing air to said solution evaporating means for saturation of said air with water vapor, means for passing air from said solution evaporating means to said product water condensing means for condensation of product water therein, and means for passing air from said product water condensing means back to said solution evaporating means for resaturation with water vapor.

3. A system defined in claim 1 including means for passing air to said solution evaporating means for saturation of said air with water vapor, means to pass saturated air from said solution evaporating means to said product water condensing means for condensation of product water therein, and means for discharging air from said product water condensing means from said system.

4. A system as defined in claim 1 including means to pass air from said solution evaporating means to said product water condensing means, and means to selectively provide two modes of operation thereof:
   (a) said first mode of operation comprising passing air in a circuit between said solution evaporating means for saturation with water vapor, to said product water condensing means for condensation of product water from said air, and passing said air back to said solution evaporating means for resaturation with water vapor; and
   (b) said second mode of operation comprising passing air to said solution evaporating means for saturation with water vapor, passing said air from said solution evaporating means to said product water condensing means for condensation of product water, and discharging said air from said product water condensing means out of said system.

5. A system as defined in claim 1 wherein said refrigeration cricuit further includes a refrigerant heat exchanger disposed in a refrigerant line between said refrigerant condenser and said refrigerant evaporator, and means to pass a cooling medium through said refrigerant heat exchanger in heat exchange relation with refrigerant therein to cool said refrigerant.

6. A system as defined in claim 5 wherein said refrigerant heat exchanger is arranged to pass refrigerant from said refrigerant condenser in heat exchange relation with aqueous solution to subcool refrigerant liquid.

7. A system as defined in claim 1 wherein said solution evaporating means comprises an evaporative condenser which is wetted with said aqueous solution to facilitate the condensation of refrigerant vapor in said refrigerant condenser.

8. A system as defined in claim 1 wherein water vapor formed in said solution evaporating means passes in heat exchange relation with aqueous solution to condense said water vapor in said condensing means.

9. A system for providing air conditioning and for simultaneously producing fresh water from an aqueous solution comprising
   (a) a refrigeration circuit including a refrigerant condenser and a refrigerant evaporator;
   (b) air saturating means to pass water vapor in contact with a body of air being conditioned to evaporate water vapor from said solution into said body of air;
   (c) air handling means for passing air being conditioned:
      (1) through said air saturating means, thereby increasing the water vapor content thereof,
      (2) from said air saturating means into heat exchange relation with said refrigerant evaporator, for condensing water vapor from said air being conditioned, and
      (3) from heat exchange relation with said refrigerant evaporator to a region being air conditioned; and
   (d) collecting and distributing means for collecting water condensed from said body of air being conditioned and distributing said product water to a desired location for use thereof.

10. An apparatus as defined in claim 9 including
   (a) refrigerant condensing means to reject heat from said refrigerant to an aqueous solution, thereby condensing said refrigerant vapor and causing water to vaporize from said aqueous solution; and
   (b) product water condensing means to remove heat from the water vapor formed in said solution evaporating means, thereby condensing water vapor to form additional fresh product water.

11. A method of simultaneously providing air conditioning and water separation by operation of a system which includes a refrigeration system comprising a refrigerant evaporator and a refrigerant condenser; said method comprising the steps of:
   (a) evaporating water from an aqueous solution by condensing refrigerant vapor in said refrigeration system in heat exchange relation with said aqueous solution, thereby supplying heat to said aqueous solution to evaporate water therefrom;
   (b) condensing and collecting fresh water product from the water vapor formed by heat exchange with condensing refrigerant vapor, by passing said water vapor in heat exchange relation with a cooling medium;
   (c) saturating a quantity of air being conditioned with water vapor by contacting said air with an aqueous solution, thereby evaporating water vapor into said air; and
   (d) condensing and collecting additional fresh water product from said air being conditioned by evaporating liquid refrigerant in said refrigeration system in heat exchange relation with said air.

12. A method as defined in claim 11 including the steps of:
   (a) passing air to said solution evaporating means for saturation with water vapor by contacting said air with aqueous solution to evaporate water from said solution into said air;
   (b) passing saturated air from said solution evaporating means to said product water condensing means for condensing water vapor from said air; and
   (c) returning air from said product water condensing means to said solution evaporating means for resaturation thereof with water vapor.

13. A method as defined in claim 11 including the steps of:
   (a) passing air to said solution evaporating means for saturation with water vapor by contacting said air with aqueous solution to evaporate water from said solution into said air;

(b) passing saturated air from said solution evaporating means to said product water condensing means for condensing water vapor from said air; and (c) discharging air from said product water condensing means from said system.

14. A method as defined in claim 11 including the additional step of passing refrigerant from said refrigerant condenser in heat exchange relation with a cooling medium prior to passage of said refrigerant to said refrigerant evaporator.

15. A method as defined in claim 11 including the additional steps of subcooling liquid refrigerant from said refrigerant condenser prior to passage of said refrigerant to said refrigerant evaporator, by passing said refrigerant in heat exchange relation with aqueous solution.

16. A method as defined in claim 11 wherein said fresh product water is condensed by passing water vapor formed by heat exchange with condensing refrigerant in heat exchange relation with aqueous solution.

17. A method of simultaneously providing air conditioning and water separation which comprises the steps of:

(a) increasing the water vapor saturation of a body of air being conditioned by contacting said body of air with an aqueous solution, thereby evaporating water from said aqueous solution into said body of air;

(b) condensing fresh product water from said body of air by evaporating a refrigerant in heat exchange relation with the saturated body of air being conditioned, thereby removing heat therefrom;

(c) passing the body of air from which the product water has been condensed to a desired region, thereby air conditioning said region; and (d) collecting and distributing the water condensed from said body to provide fresh water to a desired location.

18. A method as defined in claim 17 including the additional steps of (a) condensing the evaporated refrigerant to supply heat for vaporizing additional water from an aqueous solution into another body of air;

(b) condensing water vapor from said other body of air to form additional fresh product water; and (c) collecting said additional product water and distributing it to a desired location for use thereof.

References Cited by the Examiner

UNITED STATES PATENTS

| | | | |
|---|---|---|---|
| 3,098,735 | 7/1963 | Clark | 62—123 |
| 3,165,903 | 1/1965 | Roc | 62—93 |
| 3,234,109 | 2/1966 | Lustenader | 62—238 |

WILLIAM J. WYE, *Primary Examiner.*